US011507778B2

(12) United States Patent
Liu et al.

(10) Patent No.: US 11,507,778 B2
(45) Date of Patent: Nov. 22, 2022

(54) SYSTEM AND METHOD FOR AUTOMATED LEARNING FROM SENSORS

(71) Applicant: FUJIFILM Business Innovation Corp., Tokyo (JP)

(72) Inventors: Qiong Liu, Cupertino, CA (US);
Yanxia Zhang, Cupertino, CA (US);
Yu-Ding Lu, Merced, CA (US);
Yanjun Zhu, Buffalo, NY (US)

(73) Assignee: FUJIFILM Business Innovation Corp., Tokyo (JP)

(*) Notice: Subject to any disclaimer, the term of this patent is extended or adjusted under 35 U.S.C. 154(b) by 405 days.

(21) Appl. No.: 16/773,852

(22) Filed: Jan. 27, 2020

(65) Prior Publication Data
US 2021/0232860 A1    Jul. 29, 2021

(51) Int. Cl.
*G06K 9/00* (2022.01)
*G06K 9/62* (2022.01)
*G06N 20/20* (2019.01)
*G06N 3/04* (2006.01)
*G06N 3/08* (2006.01)

(52) U.S. Cl.
CPC ......... *G06K 9/6256* (2013.01); *G06N 3/0454* (2013.01); *G06N 3/08* (2013.01); *G06N 20/20* (2019.01)

(58) Field of Classification Search
CPC ........ G06N 3/08; G06N 20/20; G06N 3/0454; G06K 9/6256; G06K 9/6277; G06V 10/82; G06V 10/454
See application file for complete search history.

(56) References Cited

U.S. PATENT DOCUMENTS

| 5,097,326 A | 3/1992 | Meijer | |
|---|---|---|---|
| 10,943,154 B2* | 3/2021 | Taha | G06K 9/6257 |
| 11,301,995 B2* | 4/2022 | Mavroeidis | G06V 10/82 |
| 2018/0225822 A1* | 8/2018 | Zhou | G06T 7/0012 |

(Continued)

OTHER PUBLICATIONS

Harwath, D., et al., Jointly Discovering Visual Objects and Spoke Words from Raw Sensory Input, Computer Vision—ECCV 2018 Lecture Notes in Computer Science, vol. 11210, 2018, 17 pgs.

(Continued)

*Primary Examiner* — Pakee Fang
(74) *Attorney, Agent, or Firm* — Procopio, Cory, Hargreaves & Savitch LLP

(57) ABSTRACT

A computer-implemented method includes receiving first inputs associated with a first modality and second inputs associated with a second modality; processing the received first and second inputs with convolutional neural networks (CNN), wherein a set of first weights are used to handle the first inputs and a second set of weights are used to handle the second inputs; determining a loss for each of the first and the second inputs based on a loss function that applies the first set of weights, the second set of weights, and a presence of a co-occurrence; generating a shared feature space as an output of the CNNs, wherein a distance between cells associated with the first inputs and the second inputs in the shared feature space is determined based on the loss associated with each of the first inputs and the second inputs; and based on the shared feature space, providing an output.

11 Claims, 7 Drawing Sheets
(4 of 7 Drawing Sheet(s) Filed in Color)

(56) References Cited

U.S. PATENT DOCUMENTS

| | | | |
|---|---|---|---|
| 2020/0034948 A1* | 1/2020 | Park | G06N 3/0481 |
| 2021/0097401 A1* | 4/2021 | Ramalho | G06N 3/084 |

OTHER PUBLICATIONS

Hu, J., et al., Discriminative Deep Metric Learning for Face Verification in the Wild, IEEE Conference on Computer Vision and Pattern Recognition, Columbus, OH, 2014, pp. 1875-1882.

Wikipedia.org, Magnetic Resonance Imaging, [online], 30 pgs.

Oh, T-H., et al., Speech2Face: Learning the Face Behind a Voice, arXiv:1905.09773,2019, 11 pgs.

Chung, Y-A., Learning Deep Representations of Medical Images Using Siamese CNNs with Application to Content-Based Image Retrieval, 31st Conference on Neural Information Processing Systems (NIPS 2017), Long Beach, CA, Nov. 2017, 6 pgs.

Rayment, D., et al., Neuroimaging in Dementia: An Update for the General Clinician, Progress in Neurology and Psychiatry, Mar./Apr. 2016, 20(2), pp. 16-20.

Minoshima, S., et al., Metabolic Reduction in the Posterior Cingulate Cortex in Very Early Alzheimer's Disease, Annals of Neurology, 1997, 42(1), pp. 85-94.

Jagust, W., et al., SPECT Perfusion Imaging in the Diagnosis of Alzheimer's Disease: A Clinical-Pathologic Study, Neurology, Apr. 10, 2001, 56(7), pp. 950-956.

Ibanez, V., et al., Regional Glucose Metabolic Abnormalities are not the Result of Atrophy in Alzheimer's Disease, Neurology, Jun. 1, 1998, 50(6), 7 pgs.

Robertson, M. S., et al., Software-Based PET-MR Image Coregistration: Combined PET/MRI for the rest of us!, Pediatr Radiol. Oct. 2016, 46(11), pp. 1552-1561.

Hadsell, R., et al., Dimensionality Reduction by Learning an Invariant Mapping, 2006 IEEE Computer Society Conference on Computer Vision and Pattern Recognition (CVPR'06), 2006, 8 pgs.

Deng, J., et al., ImageNet A Large-Scale Hierarchical Image Database, 2009 IEEE Conference on Computer Vision and Pattern Recognition, Miami, FL, 2009, pp. 248-255.

Hoffer, E., et al., Deep Metric Learning Using Triplet Network, arXiv:1412.6622, Dec. 4, 2018, 8 pgs.

Chechik, G., et al., Large Scale Online Learning of Image Similarity Through Ranking, Journal of Machine Learning Research, 2010, 11, pp. 1109-1135.

Nene, S.A., et al., Columbia Object Image Library (COIL-100), Technical Report CUCS-006-96, Feb. 1996, 6 pgs.

Chaudhury, S., et al., Conditional Generation of Multi-Modal Data Using Constrained Embedding Space Mapping, ArXiv abs/1707.00860, 2017, 34 pgs.

Vukotic, V., et al., Bidirectional Joint Representation Learning with Symmetrical Deep Neural Networks for Multimodal and Crossmodal Applications, ICMR, ACM, Jun. 2016, New York, USA, hal-01314302, 32 pgs.

Shen, T., et al., Style Transfer from Non-Parallel Text by Cross-Alignment, 31st Conference on Neural Information Processing System (NIPS 2017), Long Beach, California, 2017, 39 pgs.

Massey, P.V., et al., Learning-Specific Changes in Long Term Depression in Adult Perirhinal Cortex, The Journal of Neuroscience, Jul. 23, 2008, 28(30), pp. 7548-7554.

Trafton, A., et al., How Neurons Lose Their Connections, MIT New, Jan. 14, 2016, 3 pgs.

Amodei, D., et al., Deep Speech 2: End-to-End Speech Recognition English and Mandarin, ICML*16: Proceedings of the 33rd International Conference on International Conference on Machine Learning, Jun. 2016, 48, pp. 173-182.

Hebb, D.O., The Organization of Behavior, A Neuropsychological Theory, 1949, John Wile & Sons, Inc., 365 pgs.

Paans, A.M.J., Positron Emission Tomography, Positron Emission Tomography Basic Sciences, Editors: Bailey, D.L., Townsend, D.W., Valk, P.E., Maisey, M.N. (Eds.), 2005, pp. 363-382.

Vimeo.Com, See What I Mean—A Speech to Image Communication Tool, 2014, 1 pg. [online] URL: https://vimeo.com/75581546.

Github.com, Lip Reading—Cross Audio-Visual Recognition using 3D Convolutional Neural Networks—Official Project Page, [online] URL: https://github.com/astorfi/lip-reading-deeplearning.

Github.com, Neural-Storyteller, [online] 4 pgs. URL: https://github.com/ryankiros/neural-storyteller.

Van den Oord, A., et al. WaveNet: A Generative Model for Raw Audio, arXiv:1609.03499, 2016, 15 pgs.

* cited by examiner

SYSTEM AND METHOD FOR AUTOMATED LEARNING FROM SENSORS

BACKGROUND

Field

Aspects of the example implementations relate to methods, systems and user experiences associated with learning directly from multiple inputs of sensory data having different modalities, and more specifically, use of audio-visual data sets in a neural network based on a co-occurrence in time of the inputs.

Related Art

Related art machine learning approaches to neural networks may lack sufficient volume and quality of training data. This related art issue may occur due to a shortage of human labelers, labeling cost, and labeling time limitations. Further, related art machine learning approaches for neural networks mainly rely on text, because available data sets are labeled with text. To the extent that speech and vision data is provided for machine learning in neural networks, related art approaches still require text labels to learn speech and vision.

The shortage of training data may occur due to various factors, including but not limited to a shortage of human labelers, the cost of performing the labeling, issues associated with verification and validation of labeling quality, and time limitations that result in delayed but labeled data as being not usable for machine learning in neural networks.

For example, related art machine learning approaches may be short of training data. On the other hand, related art sensors, such as Internet of Things (IoT) sensors, continuously transmit data. However, sensor data cannot be used by the related art machine learning approaches, without requiring recording and manual labeling. Such related art recording and manual labeling activity may deviate from or disrupt true human machine learning heuristics.

For example, related art magnetic resonance imaging (MRI) and positron emission tomography (PET) may be used for medical diagnosis. An MM scan may use magnetic fields and radio waves to form images of target tissues such as organs and other structures inside a human body, and a PET scan may use radioactive tracers to diagnose diseases by examining body functions at the cell level. An MRI scan is less intrusive than a PET scan, and much cheaper, more convenient and less harmful to a human. However, a PET scan gives a better visualization of certain characteristics, such as metabolism, blood flow, oxygen use and the like. Thus, it may be necessary to perform a PET scan to obtain the necessary information for a diagnosis of a condition (e.g., dementia). Accordingly, the related art PET/MRI image pairs are collected by medical providers. However, these related art data pairs are not mapped in the same feature space.

Accordingly, there is an unmet need to overcome the issues associated with obtaining training data in the related art, and using sensor data in machine learning activities.

SUMMARY

According to an aspect of the example implementations, a computer-implemented method is provided for receiving first inputs associated with a first modality, and second inputs associated with a second modality; processing the received first inputs and second inputs in a convolutional neural network (CNN), wherein a first weight is assigned to the first inputs and a second weight is assigned to the second inputs; determining a loss for each of the first inputs and the second inputs based on a loss function that applies the first weight, the second weight, and a presence of a co-occurrence; generating a shared feature space as an output of the CNN, wherein a distance between cells associated with the first inputs and the second inputs in the shared feature space is determined based on the loss associated with each of the first inputs and the second inputs; and based on the shared feature space, providing an output indicative of a classification or probability of a classification.

According to another aspect of the example implementations, a computer-implemented method is provided for receiving historical pairing information associated with a pairing of a positron emission tomography (PET) image and a magnetic resonance imaging (MRI) image; providing the historical pairing information of the PET image and the MM image to a neural network which includes a PET learning network and a MRI learning network, to generate a PET network output feature and a MRI network output feature for a shared feature space and learning a mapping weight of the PET network, and a mapping weight of the MM network; providing an unseen MM image; and generating an output of the shared feature space that provides the PET image associated with the unseen MM image based on the the historical pairing information and a loss function.

Example implementations may also include a non-transitory computer readable medium having a storage and processor, the processor capable of executing instructions for learning directly from multiple inputs of sensory data having different modalities.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
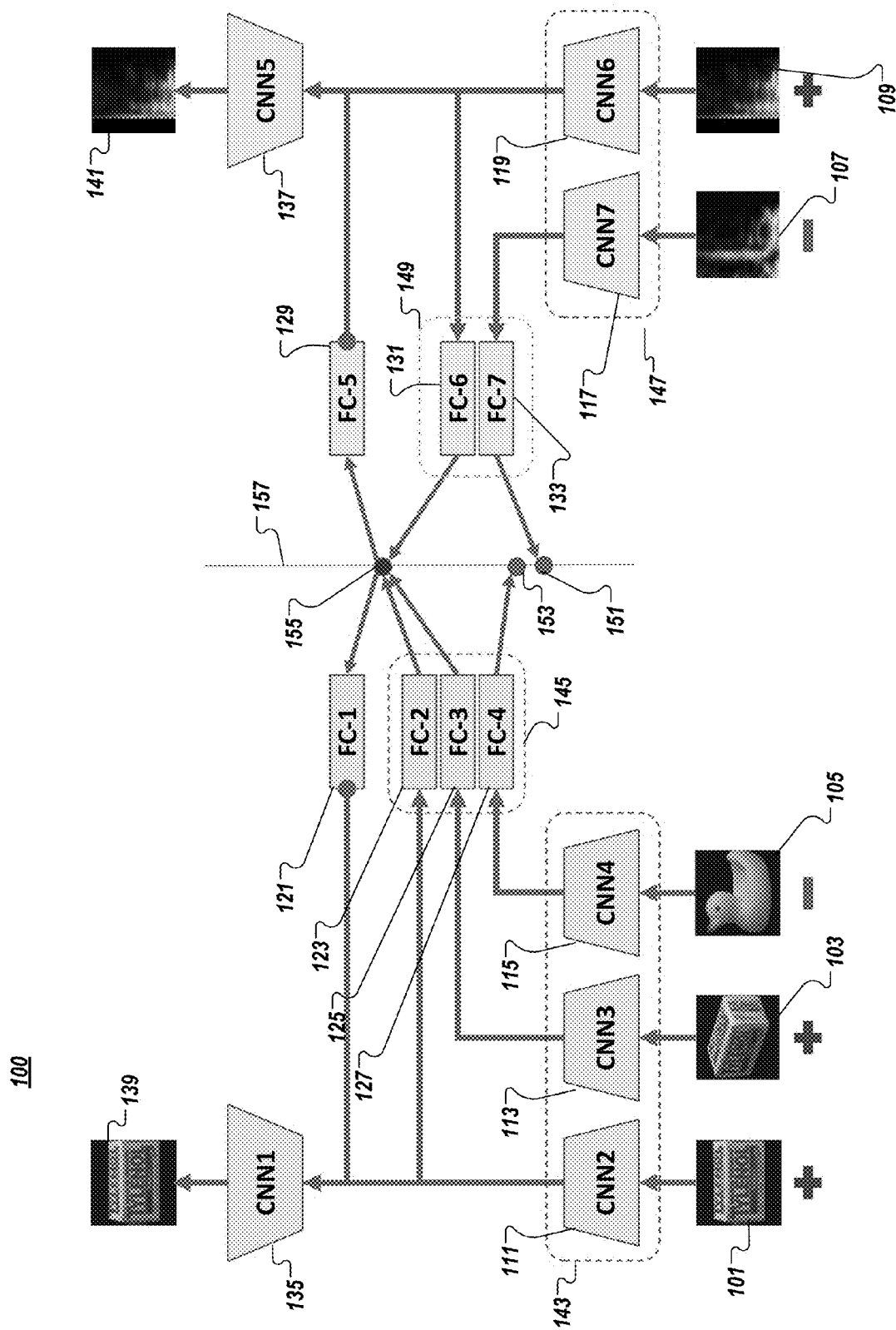
FIG. 1 illustrates various aspects of an architecture according to an example implementation.

The following detailed description provides further details of the figures and example implementations of the present application. Reference numerals and descriptions of redundant elements between figures are omitted for clarity. Terms used throughout the description are provided as examples and are not intended to be limiting.

Aspects of the example implementations are directed to systems and methods associated with automated learning and neural network processing from sensors. The example implementations provide algorithms that can directly learn from sensors, and that may alleviate dependence of machine learning on the availability of human labelers, reduce labeling cost, and/or provide for facilitation of machine learning for various applications.

Accordingly, audio-visual data sets are used in the example implementations to test a learning model and training performance. The example implementations may be applied to sensor data (e.g., IoT sensor data) having one or more modalities, such as an audio modality and a visual modality. For example but not by way of limitation, medical image conversion from different sources and multiple patients may employ the example implementations, based on medical imaging data.

IoT sensors have a large volume of data that is continuously available over time. The data is received in a variety of modes, such as visual, audio, temperature, humidity, etc. The data received from the IoT sensor is in different modes, and the data of the different modes may not be comparable. For example, an image received from a camera may be transmitted as a photo image, whereas audio received from a a microphone may be transmitted as a sound file. The formats of the sensor data from the different modes cannot be labeled in a standardized manner, short of using labor-intensive, time-consuming related art approaches that may require conversion to another format (e.g., text).

Example implementations include an architecture and one or more training methods for automation of sensor data learning and use in neural networks, within a modality and across modalities. For example, but not by way of limitation, the sensory inputs may be directed to audiovisual learning (e.g., learning of audiovisual relations). Instead of requiring explicit labeling devices, such as a keyboard or a mouse, to be associated with a user, a sensor may be used to provide audiovisual training data continuously, without the labeling devices attached to the user.

According to the example implementations, a time-window approach is employed for training. For example, if data, such as an image and a sound, occur in a sequence within a close time interval, they are grouped together. On the other hand, if data occurs at distant times, it is not grouped together. Further, by not requiring storage, translation and/or manual labeling, the IoT sensors may more closely match true human behavior, by allowing sensory input and processing thereof that is not interrupted by storage, manual labeling, recording, or other processing activity.

FIG. 1 illustrates an architecture for sensory media autonomous learning according to an example implementation. The architecture 100 includes a plurality of inputs 101, 103, 105 of a first modality, in this example implementation, visual. For example, the visual input may be received from a sensor associated with image capture, such as a camera. The architecture 100 also includes inputs 107, 109 of a second modality, in this example implementation, audio. For example, the audio input may be received from a sensor associated with audio capture, such as a microphone. Accordingly, inputs 101, 103, 105 may be image capture files, and inputs 107, 109 may be audio files. As explained herein, the inputs remain in their modality, and are not converted to text or other modality.

The inputs are received by a neural network. For example, the first input 101 of the visual modality may be received by a corresponding first convolutional neural network (CNN) 111. Similarly, inputs 103 and 105 by second and third CNNs 113 and 115, respectively. Further, the first input 107 of the audio modality may be received by a corresponding first CNN 117, and subsequent input 109 may be received by a second CNN 119.

The outputs of the CNNs 111-119 are respectively provided to the fully connected layers 121-133, respectively. Additionally, beyond the fully connected layer, or shared feature space, at least one further CNN is provided for each of the modalities as 135 and 137, respectively, as an anchor. Accordingly an output 139 and an output 141 are generated, indicative of a classification or probability associated with a classification of the object in the inputs.

A weighting approach is also provided for the different modalities. For example, 111, 113, 115 share the same weights (as represented by broken line box 143), and 117 and 119 share the same weights (as represented by broken line box 147), 123, 125, 127 share the same weights (as represented by broken line box 145), and 131 and 133 share the same weights (as represented by broken line box 149).

The shared feature space is represented as line 157 in FIG. 1. Although the shared space is represented with a line at 157, as would be understood by those of ordinary skill in the art, the representation is not limited to a linear representation, and may alternatively be a high dimensional space in the model according to the example implementations.

As explained below, the approach according to the example implementations determines co-occurrence and strength of connection between different inputs. For example, as shown in FIG. 1, inputs having a stronger connection based on co-occurrence are marked with a "+", whereas those inputs having a weaker connection based on lack of co-occurrence are marked with a "−". The process of allowing strengthening and weakening is explained in further detail below. In the shared representation space, or fully connected layer, the stronger connections may be marked with a dot showing the connections at 155, whereas the weaker connections may be marked by dots that are not connected, such as 151 and 153.

Audio training may be achieved by converting audio inputs (e.g., to 2-D Mel-Spectrogram), so that images may be handled in a similar manner. Interference between an image channel and an audio channel may be avoided by employing different weights in the audio encoder and the image encoder. Similarly, different weights may be employed at the audio decoder and the image decoder.

As shown in FIG. 1, networks within every dashed-line box have common weights. For example, but not by way of limitation, if three convolutional neural networks (CNNs) are in a dashed-line box due to their co-occurrence, those three CNNs may be assigned a common weight. If three fully connected networks are in a common dashed-line box, those three fully connected networks may be assigned a common weight. According to the example implementation, weights are not shared across dashed-line boxes.

As is understood in the art of neural science, any two cells or systems of cells that are repeatedly active at the same time may become "associated", such that activity in one cell or system facilitates activity in the other cell or system. The example implementations herein employ a shared feature space to simulate this approach, such that a time span (e.g., several seconds) of activities may lead to facilitated activity in the network. More specifically, if two or more feature vectors become associated, the model of the example implementation will force those feature vectors to become closer in the feature space. For feature vectors that happen at different times, the model will force those feature vectors to be further away from each other in the feature space. This enforcement may occur regardless of whether the data is from the same modality or from different modalities.

With this training, the model according to the example implementations may form an embedding feature space that is shared by the vision modality and the speech modality. This shared feature space learning process may correspond to a Siamese architecture feature space formation process. However, unlike the Siamese architecture feature space formation process, the present example implementation may be employed for learning across modalities and over time.

According to one example implementation of the architecture, the model may mimic a teaching process, such as a process associated with teaching a child. For example, but not by way of limitation, in order to teach a child to name an object with speech, the child is provided the object, and the corresponding pronunciation in terms of speech, at substantially the same time.

Thus, the child may be provided with continuous "vision frames" of the object in different angles, scales and lighting conditions; because the images occur at substantially the same time, their features in the present architecture will be forced together, to simulate the association process explained above. For example, this feature may be considered as a self-supervision process, or feature space formation.

As shown in FIG. 1, two images are provided as input associated with a product packaging, with the images captured at different angles. Because these images are contemporary with respect to each other in a teaching process, their features are forced toward a common place, indicated by a dot 155 in the shared feature space. After the shared feature space 157 is well-formed, it can be an embedding space for both vision data and audio data.

The inputs associated with the present example implementation may be received via IoT sensors, for example. In some example implementations, the IoT sensors may be combining audio and visual modes to provide training and machine learning, while also avoiding the need for additional storage cost and communication cost, as there is no need to store or manually label the data.

For example, but not by way of limitation, the foregoing example implementation may be integrated into a robotic system, and provide a robot with a capacity to more closely match human behavior, and provide better service. A robot that is a caretaker for an elderly or injured person may be able to use audio and visual IoT as inputs in the foregoing approach to more quickly and accurately provide appropriate care and attention.

Further, the present example implementation may also have other applications. For example, but not by way of limitation, the example implementations may be integrated with an electronic device, such as a smartphone or home support device. Because the present example implementation can be used on IoT sensors without latency, storage, and manual labeling cost, such devices may be customized for a particular user. Such customization may be performed without providing data to a third party. For example, instead of storing and manually labeling the data, the example implementation can locally perform the learning and processing in a privacy-preserving manner.

In the foregoing example implementation, in addition to supervision based on the same modality, it is noted that the spoken name (e.g., Tylenol) may be pronounced when shown. Thus, the audio feature in the representation space is also forced to the same location at 155. FIG. 1 illustrates all sensor inputs that are associated with another with "+" symbols, such as 101, 103 and 109.

To simulate the long-term depression process that allows cells to weaken, and eventually eliminate the port connections, the model may allocate a memory that can randomly sample past media data, and enforce the features of the past media data that tend to stay away from the feature of the current media data. Those media inputs may be marked with "−" symbols as shown in FIG. 1, such as 105 and 107. Their representations are indicated in the shared representation space at 151 and 153. For those media data as inputs, a contrastive loss function is used to simulate the neuron wiring process and the long-term depression process. Thus, the loss function may be described at Formula (1) as follows:

$$L(W_I, W_A, \vec{X}_i) = \Sigma_i \{(1-Y_i)D_i^2 + Y_i[\max(0, m-D_i)]^2\} \quad (1)$$

It is noted that L represents the loss function, $W_I$, and $W_A$ represent feature encoding weights for image channel and audio channel respectively, $\vec{X}_i$ is the input of the $i^{th}$ media in sequence, $Y_i$ is an indicator of association (0 being indicative of an association, and 1 being indicated if of a non-association) m is a margin in the shared feature space, $D_i$ is the Euclidian distance between the $i^{th}$ media representation and the anchor media representation.

In the training according to the example implementation, an image channel is used as an anchor channel. However, the example implementations are not limited thereto, and an audio media segment may also be used as an anchor which changes over time.

A distance between the $i^{th}$ representation and the anchor representation may be described at Formula (2) as follows:

$$D_i = \|\vec{F}_i - \vec{F}_a\|_2 \quad (2)$$

It is noted that $\vec{F}_i$ and $\vec{F}_a$ are the $i^{th}$ input shared-space feature representation and anchor input shared-space feature representation respectively. They are high-dimensional outputs of corresponding fully connected networks.

According to the example implementations, instead of using a triplet loss function or the triplet network loss function, a simple summation of contrasting loss as a loss function is implemented. The simple summation of contrast of loss allows for the system to handle data that is being provided from a random number of inputs, instead of requiring the data to form triples prior to processing. As a result, the example implementations may avoid this issue for online learning. Further, because contrastive loss pushes features of the same object and co-occurred speech to each other, adding a small disturbance to a representation may trigger many corresponding images or speech options related to that representation.

The compact representation space also provides a capability for the system to learn a complicated task. For example, but not by way of limitation, because contrastive loss and triplet loss labelers need to manually organize data into pairs or triples, large-scale data is required for training, and the training may be slower than traditional classifiers. If human preparation of the data is required prior to the training, there may be problems and disadvantages. On the other hand, according to the example implementation, the machine may continuously receive data from sensors and learn that data automatically. Thus, the barriers associated with manually generated labels may be avoided.

According to the present example implementation, two paths are provided to handle "consecutive" images that are associated with one another, and one path is provided to handle speech associated with one another. Because there is a greater amount of time associated with an utterance of a word, the longer utterance time may weaken the associated effect associated with an audio channel, as compared with an image channel.

Further, speech repetition may be a less common occurrence than image repetition, such as seeing the same object from different angles. More similar images may be processed in a similar frame within the same amount of time. Because adding additional similar image channels may feed these images through the same image channel sequentially, it may not be necessary to add extra similar image paths according to the example implementation. However, the example implementations are not limited thereto, and if the model is used for learning from other samples, learning path arrangement may be adjusted accordingly.

In addition to the cross modal shared feature space, one or more media generators are provided, to generate media outputs based on features in the shared feature space. According to this example approach, an image or an audio input may trigger outputs that may have had a similar input in the past. For example, not by way of limitation, an object image input with a small disturbance feature space may trigger output images of the object having different angles and lighting conditions.

Similarly, a speech input may trigger various output of the object. The foregoing approach according to the example implementations may be similar to a model of human imagination that is based on a speech input. Further, an image input may also activate a speech output that is associated with the past similar image, similar to the naming process for an object.

The example implementation includes fully connected layers between the auto encoder latent layers, and the shared feature space, to account for the differences between the audio latent space and the image latent space in related art auto encoders. More specifically, the example implementations introduce three fully connected layers between each latent space and the shared space, to achieve a shared space formation goal.

Further, according to the example implementations, because of the significant feature space difference described above, the example implementations may require three fully connected layers, for converting a shared feature to an audio feature or an image feature. Because the fully connected layers may increase signal generation uncertainty, shortcuts are added between latent spaces of encoders and decoders to bypass fully connected layers, for training stability.

According to the present example implementations, in a learning network, each artificial neuron may provide a weight vector for projecting its input data to its output space. The activation function may be used to select part of a projection or to map the projection to a limited range. If each artificial neuron is characterized as a communication channel, its channel capacity is fixed once its structure has been fixed.

On the other hand, the example implementations may train each decoder layer as an inverse of its corresponding encoder layer, before final network tuning from end to end. During the training, the example implementations may feed training data to both input and output in a similar way to the autoencoder training.

Figure 2:
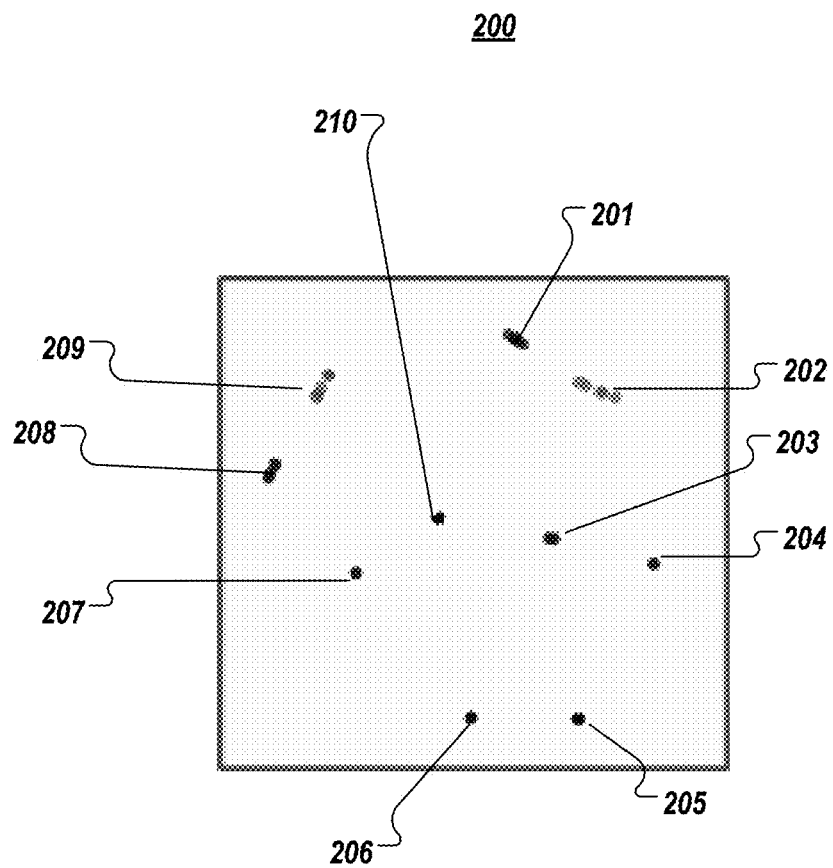
FIG. 2 illustrates example results associated with an implementation of the architecture according to the example implementation.

As shown in FIG. 2, a t-SNE visualization of the audio-visual embedding space trained with CIFAR-10 images and 10-category speech segments corresponding to CIFAR-10 labels is provided. By training the system with paired audiovisual data, without providing labels or number of categories, the model automatically forms 10 clear clusters 201-210 in the embedding space 200.

As an example test of the foregoing example implementations, a dataset was generated based on the Columbia Object Image Library (COIL-100) [9], which is a database of color images of 100 objects. For audio segments corresponding to these objects, 100 English names were created, such as 'mushroom', 'cetaphil' etc. Watson Text to Speech was used to generate corresponding audio segments for different objects by varying voice model parameters such as expression etc. The new dataset had 72 images and 50 audio segments for each object. In this dataset, 24 images and 10 audio segments from each object category were randomly sampled and used as test data. The remaining images and audio segments were used as training data. Pairing of these images and audio segments was based on 100 underlying object states of the signal generation machine.

With the foregoing data, the foregoing example implementation was trained and tested. With a related art standard binary classifier, the system could distinguish if an image pair is from the same category or not with 92.5% accuracy. If images were fed to a related art trained Siamese network, the system could distinguish if an image pair is from the same category or not with 96.3% accuracy. When both image and audio modalities are used with the example implementations described herein, the binary classification accuracy is 99.2% on this dataset.

The foregoing example implementations may also be used to pair different modalities of information to a common feature space. For example, because there are many existing PET/MRI image pairs that have been collected, for example by medical providers, it is possible to use the existing PET images and the PET/MRI pairing relations, to provide reference PET images to doctors, based on MRI images. As a result, it may be possible to reduce a need for future PET scan reduction, and also avoid unnecessary costs, procedure, radiation damage, etc. to patients. Further, doctors may be able to have decision support, or make decisions, based on retrieval of similar PET cases, based on MRI images only.

More specifically, PET/MRI pairing information may be used to map the same PET/MRI image pair to the same location in a learned feature space. Then, a subsequent MM mapping in the feature space may be used to retrieve similar cases associated with closely related PET images, which have features that are similar to the MRI image features.

MRI and PET images, although they are generated using different techniques, with different risk factors, advantages and disadvantages, may be used in combination to diagnose diseases, such as dementia for example. Thus, combined PET/MRI machines provide paired images. However, PET scans generate a significant amount of radiation exposure that can place a patient at risk. The example implementations use the paired PET/MRI images to reduce the necessity for PET scans.

Figure 3:
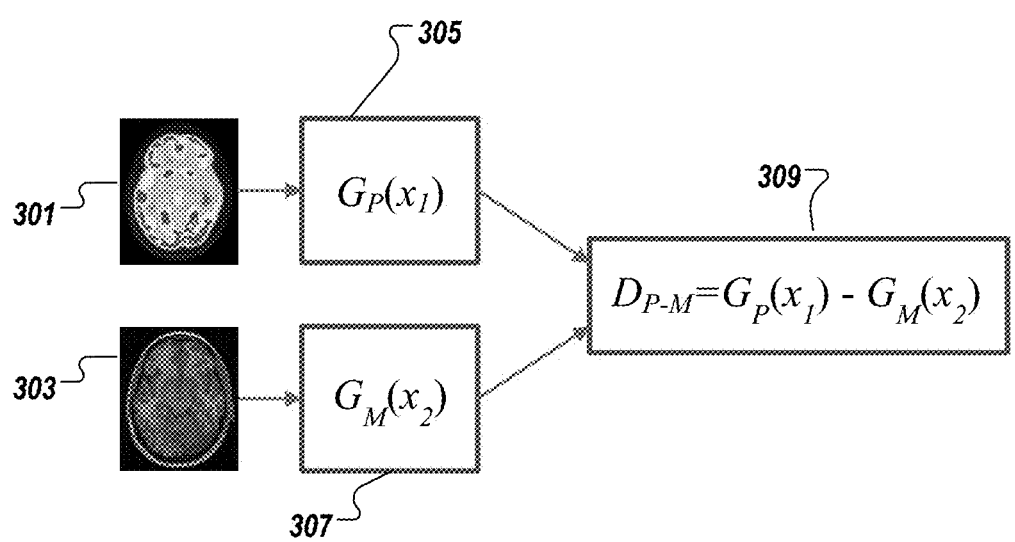
FIG. 3 illustrates mapping of MRI and PET images to the same feature space according to an example implementation.

FIG. 3 illustrates a learning architecture 300 according to the example implementations. For example, slices of a PET image 301 and a corresponding MM image 303 are passed through to two networks with the different weights, referred to at 305 and 307. The output feature difference is applied at 309 to guide the weight learning of one network. For example, but not by way of limitation, two independent networks may be used to learn mapping weights for the MM and PET images, respectively. This example approach may weight learning interferences between MRI images and PET images.

More specifically, Formula (3) provides an example loss function for the neural network according to the example implementations:

$$L(W_P, W_M, Y, \vec{X}_P,$$
$$\vec{X}_M) = (1-Y)(D_{P-M})^2 + Y\{\max(0, m - D_{P-M})\}^2, \quad (3)$$

where $W_P$ and $W_M$ are weights of the two mapping networks, $X_P$ and $X_M$ are input images from the PET and MRI modalities, m is a margin setup, $D_{P-M}$ is absolute difference between network outputs, Y indicates if $X_P$ and $X_M$ are paired images or not. Y is 1 if inputs are paired images and 0 if inputs are not paired images.

Figure 4:
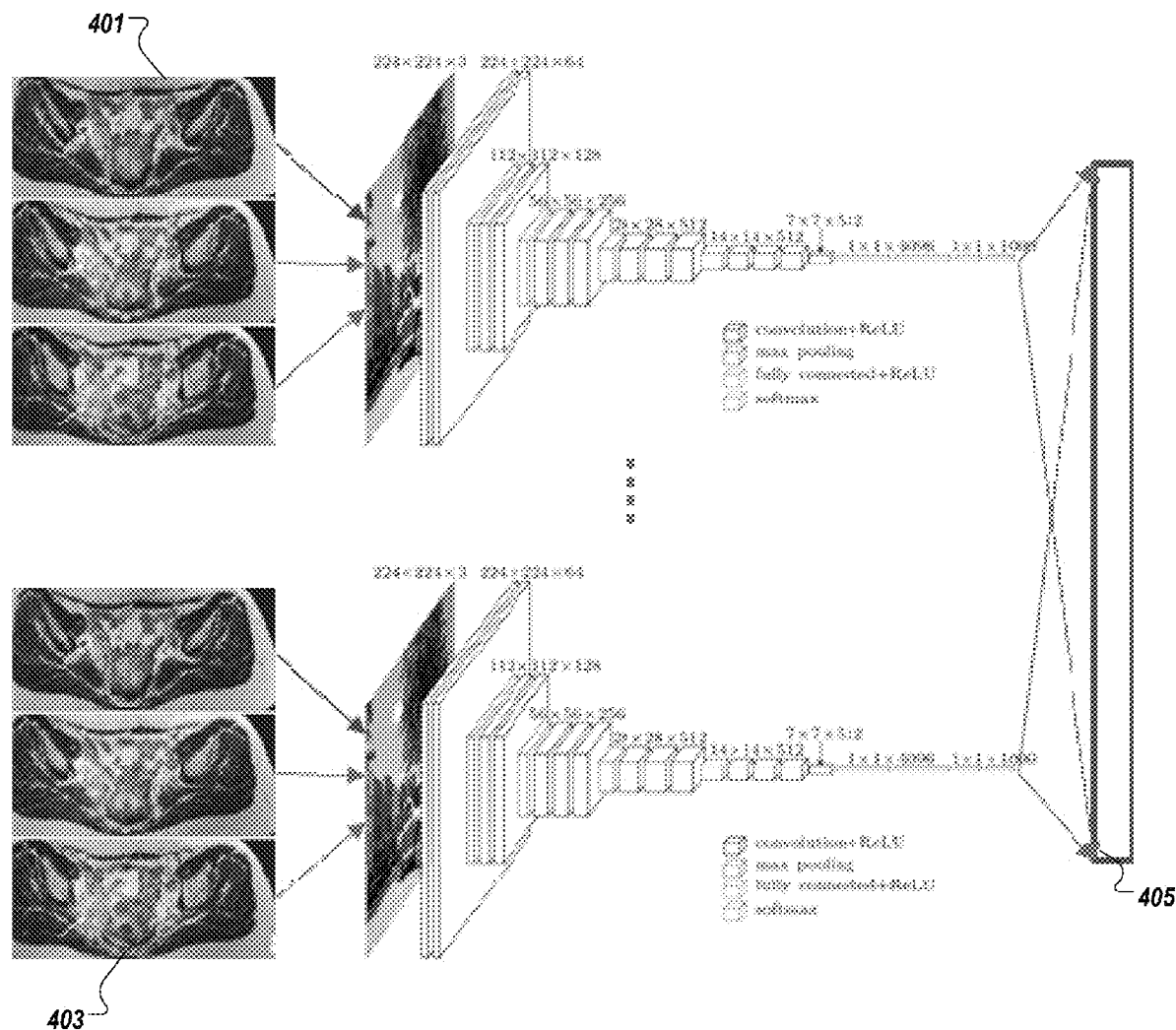
FIG. 4 illustrates use of parallel architectures for handling PET/MRI images according to an example implementation.

FIG. 4 illustrates an example implementation 400 that uses the PET/MRI images. For example, many PET/MRI images are grayscale images. Here, inputs 401 and 403 are fed into neural network 405. Further, many pre-trained CNN networks have RGB channels. Thus, the example implementations pack consecutive PET/MRI slices in RGB channels, and use parallel architectures to process consecutive images. Further, a fully connected network, such as that described above and illustrated in FIG. 1, is employed to combine outputs of all DNNs for a feature space.

The architecture of FIG. 4 may be used for either PET or MM image mapping, to the feature space. Because this structure uses the same networks multiple times where the number of slices is greater than a prescribed number (e.g., 3), this example implementation is flexible for different system setups.

For example, when a system has limited memory and processing power such as limited GPU's, the same network can be used multiple times on tri-slices. The final features can be combined computed at different times. On the other hand, if a system has many GPUs and significant memory, the computation may be parallelized by duplicating the same network multiple times for different GPUs.

The network 405 may employ an architecture such as that shown and described above with respect to FIG. 1. For example, but not by way of limitation, paired PET and Mill images are only provided for training, and during the application, and Mill image is generated to retrieve "similar" PET images of other patients, to avoid the need to take more PET images. It is noted that the mapping networks for the PET and Mill images may be different networks.

As is the case with respect to FIG. 2 above, the example implementations herein enforce the same feature space for the PET and MRI images. Further, both networks may be adaptable for forming the feature space, so as to provide flexibility that may optimize quality of the feature space. Thus, co-occurred features may have more flexibility to be closer together, and features that do not co-occur may have more freedom to be separate apart, as also explained above with respect to FIG. 2.

Figure 5:
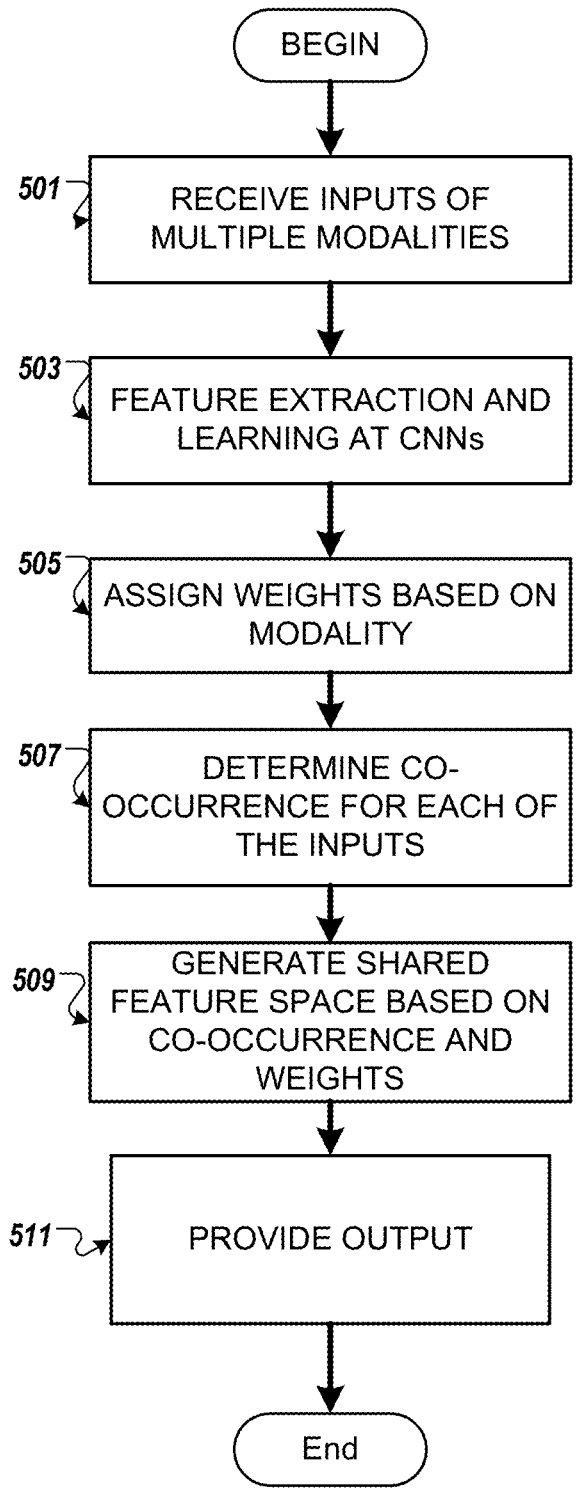
FIG. 5 illustrates an example process for some example implementations.

FIG. 5 illustrates an example process 500 according to the example implementations. The example process 500 may be performed on one or more devices, as explained herein.

At 501, the neural network receives inputs. More specifically, the neural network receives inputs of a first type that are associated with a first modality, and inputs of a second type that are associated with a second modality. For example, but not by way of limitation, the inputs of the first type may be received images associated with the visual modality, such as images received from a sensor having a camera. Also for example but not by way of limitation, the inputs of the second type may be received sound files or graphs associated with an audio modality, such as the output received from a sensor having a microphone.

While cameras and microphones are disclosed as sensor structures, the present example implementations are not limited thereto, and other sensors may be substituted therefor without departing from the inventive scope. Further, because the inputs are received from sensors such as IoT sensors, the inputs that are received by the neural network may be continuously received over time, including but not limited to real time.

At 502, the CNN layers of the neural network process the received inputs. More specifically, one neuron of the CNN may process one input. The CNN may have one or more layers, and may perform learning and/or training based on the inputs as well as historical information. For example but not by way of limitation, CNN may include one or more convolution layers, as well as optionally, pooling layers. As would be understood by those skilled in the art, a hidden layer may be provided, depending on the complexity of the task being performed by the neural network. As explained in greater detail below, weights are assigned to the layers of the CNN. The CNN may receive the one or more inputs, applying a function as explained above such as Formulas (1) and (2), to generate one or more feature maps that are provided for the shared feature space, in the fully connected layer.

More specifically, at 505, weights are learned by the neurons of the CNN. The weights are learned, for example, based on the modality of the input. An input that is of a first modality, such as visual, may train the system in a different way from an input that is of a second modality, such as audio. For example, but not by way of limitation this is shown in FIG. 1 as elements 143 and 147.

Further, at 507, a determination is made with respect to whether a co-occurrence exists. For example, but not by way of limitation, as explained above, when a word associated with packaging is pronounced by audio as a co-occurrence with a timing of a sensor input associated with an appearance of that word on the packaging, this is determined to be the situation of a co-occurrence. For each of the inputs across each of the modalities, a determination as to whether there is a co-occurrence is made. Results of the determination, along with the encoding weights based on modality, are applied to a loss function, such as (1) and (2), to make a determination as to the loss associated with an input.

At 509, a shared feature space is generated as an output of the CNN layer. As explained above, the loss function and weighting can be used to simulate a neuron wiring process and a long-term depression process, such that some cells to weaken their connections and have a greater distance, whereas other cells strengthen their connection and have a shorter distance, or a common position in the shared feature space.

For example, but not by way of limitation, as shown in FIG. 1, the outputs of the CNN layer are shown as reference numerals 121-133, and the feature space is represented as a plane at 157. Further, cells with weaker connections due to lack of co-occurrence are shown at 151 and 153, whereas cells with stronger connections due to the presence of co-occurrence are shown at 155, for example.

At 511, an output is provided. For example but not by way of limitation, the output may be an indication as to the classification of the input, or the probability classes that provide a best fit classification of the input. As would be understood by those skilled in the art, training may occur, such as by back propagation.

Figure 6:
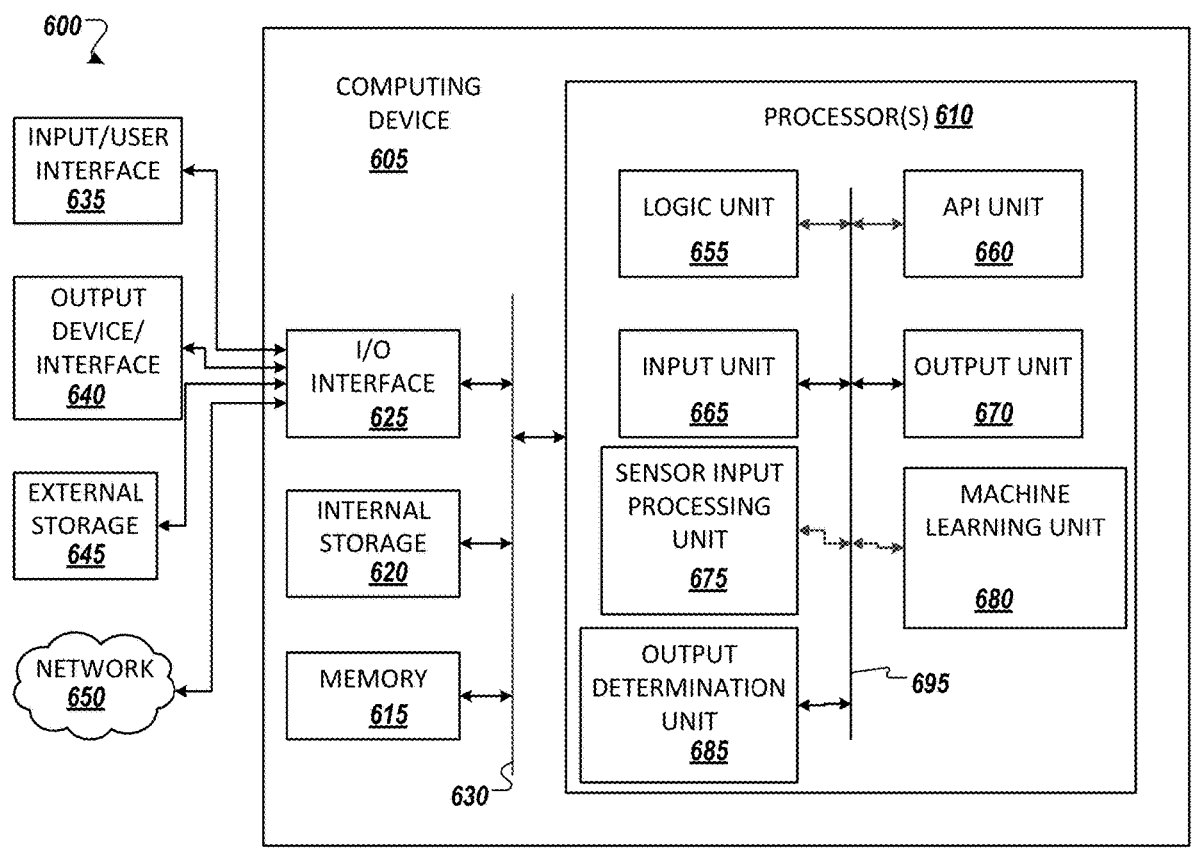
FIG. 6 illustrates an example computing environment with an example computer device suitable for use in some example implementations.

FIG. 6 illustrates an example computing environment 600 with an example computer device 605 suitable for use in some example implementations. Computing device 605 in computing environment 600 can include one or more processing units, cores, or processors 610, memory 615 (e.g., RAM, ROM, and/or the like), internal storage 620 (e.g., magnetic, optical, solid state storage, and/or organic), and/or I/O interface 625, any of which can be coupled on a communication mechanism or bus 630 for communicating information or embedded in the computing device 605.

According to the present example implementations, the processing associated with the neural activity may occur on a processor 610 that is the central processing unit (CPU). Alternatively, other processors may be substituted therefor without departing from the inventive concept. For example, but not by way of limitation, a graphics processing unit (GPU), and/or a neural processing unit (NPU) may be substituted for or used in combination with the CPU to perform the processing for the foregoing example implementations.

Computing device 605 can be communicatively coupled to input/interface 635 and output device/interface 640. Either one or both of input/interface 635 and output device/interface 640 can be a wired or wireless interface and can be detachable. Input/interface 635 may include any device, component, sensor, or interface, physical or virtual, which can be used to provide input (e.g., buttons, touch-screen interface, keyboard, a pointing/cursor control, microphone, camera, braille, motion sensor, optical reader, and/or the like).

Output device/interface 640 may include a display, television, monitor, printer, speaker, braille, or the like. In some example implementations, input/interface 635 (e.g., user interface) and output device/interface 640 can be embedded with, or physically coupled to, the computing device 605. In other example implementations, other computing devices may function as, or provide the functions of, an input/interface 635 and output device/interface 640 for a computing device 605.

Examples of computing device 605 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 605 can be communicatively coupled (e.g., via I/O interface 625) to external storage 645 and network 650 for communicating with any number of networked components, devices, and systems, including one or more computing devices of the same or different configuration. Computing device 605 or any connected computing device can be functioning as, providing services of, or referred to as, a server, client, thin server, general machine, special-purpose machine, or another label. For example but not by way of limitation, network 650 may include the blockchain network, and/or the cloud.

I/O interface 625 can include, but is not limited to, wired and/or wireless interfaces using any communication or I/O protocols or standards (e.g., Ethernet, 802.11xs, Universal System Bus, WiMAX, modem, a cellular network protocol, and the like) for communicating information to and/or from at least all the connected components, devices, and network in computing environment 600. Network 650 can be any network or combination of networks (e.g., the Internet, local area network, wide area network, a telephonic network, a cellular network, satellite network, and the like).

Computing device 605 can use and/or communicate using computer-usable or computer-readable media, including transitory media and non-transitory media. Transitory media includes transmission media (e.g., metal cables, fiber optics), signals, carrier waves, and the like. Non-transitory media includes magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 605 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 610 can execute under any operating system (OS) (not shown), in a native or virtual environment. One or more applications can be deployed that include logic unit 655, application programming interface (API) unit 660, input unit 665, output unit 670, sensor input processing unit 675, machine learning unit 680, output determination unit 685, and inter-unit communication mechanism 695 for the different units to communicate with each other, with the OS, and with other applications (not shown).

For example, the sensor input processing unit 675, the machine learning unit 680, and the output determination unit 685 may implement one or more processes shown above with respect to the structures described above. The described units and elements can be varied in design, function, configuration, or implementation and are not limited to the descriptions provided.

In some example implementations, when information or an execution instruction is received by API unit 660, it may be communicated to one or more other units (e.g., logic unit 655, input unit 665, sensor input processing unit 675, machine learning unit 680, and output determination unit 685).

For example, the sensor input processing unit 675 may receive and process information, from one or more sensors, as explained above. An output of the sensor input processing unit 675 is provided to the machine learning unit 680, which performs the necessary operations based on the application of the neural networks as described above and illustrated in FIG. 1, for example. Additionally, the output determination unit 685 may provide an output signal, based on the outputs of the sensor input processing unit 675 and the machine learning unit 680.

In some instances, the logic unit 655 may be configured to control the information flow among the units and direct the services provided by API unit 660, input unit 665, sensor input processing unit 675, machine learning unit 680, and output determination unit 685 in some example implementations described above. For example, the flow of one or more processes or implementations may be controlled by logic unit 655 alone or in conjunction with API unit 660.

Figure 7:
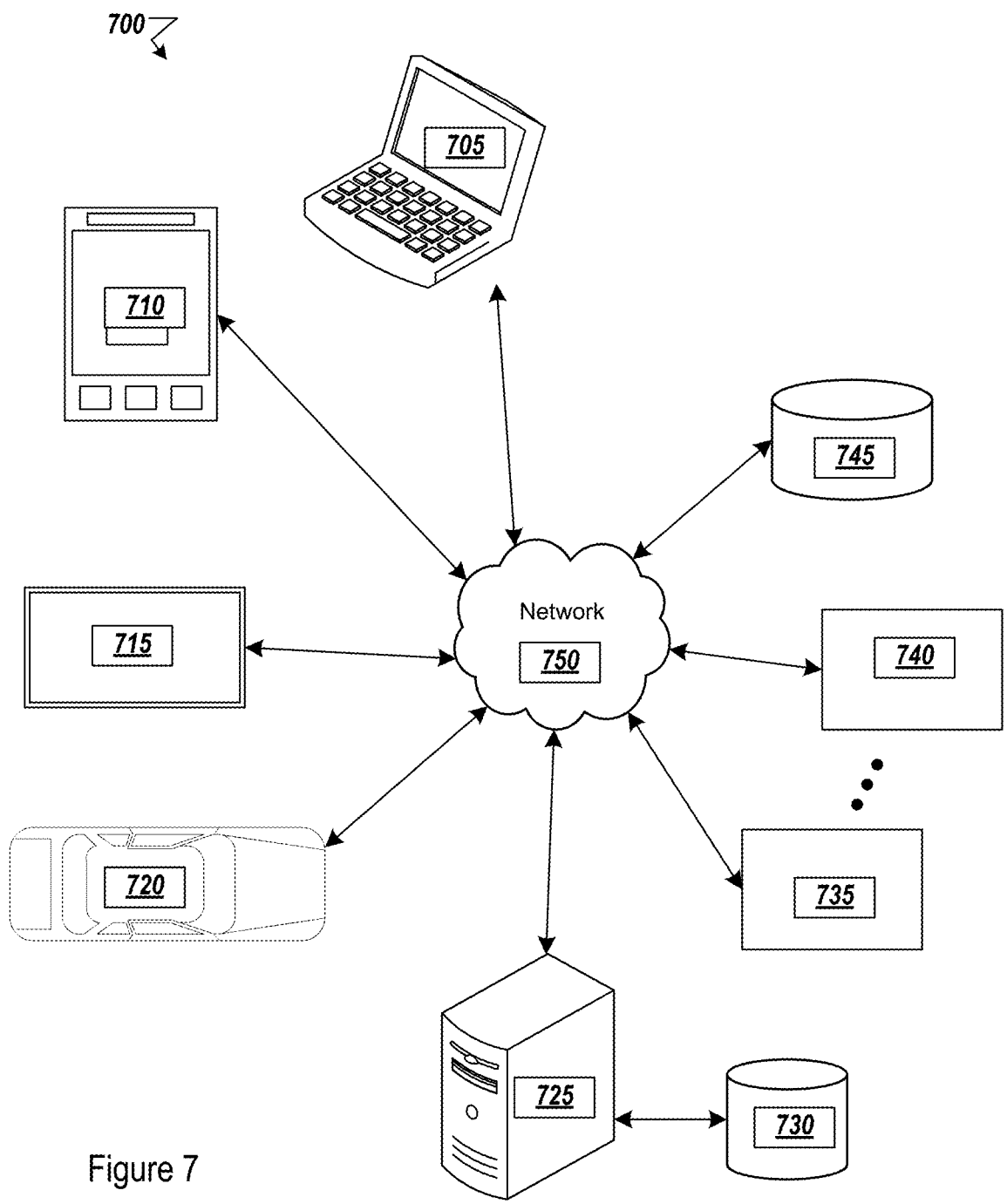
FIG. 7 shows an example environment suitable for some example implementations.

FIG. 7 shows an example environment suitable for some example implementations. Environment 700 includes devices 705-745, and each is communicatively connected to at least one other device via, for example, network 760 (e.g., by wired and/or wireless connections). Some devices may be communicatively connected to one or more storage devices 730 and 745.

An example of one or more devices 705-745 may be computing devices 605 described in FIG. 6, respectively. Devices 705-745 may include, but are not limited to, a computer 705 (e.g., a laptop computing device) having a monitor and an associated webcam as explained above, a mobile device 710 (e.g., smartphone or tablet), a television 715, a device associated with a vehicle 720, a server computer 725, computing devices 735-740, storage devices 730 and 745.

In some implementations, devices 705-720 may be considered user devices associated with the users, who may be remotely obtaining a sensed input used as inputs for the foregoing example implementations. In the present example implementations, one or more of these user devices may be associated with one or more sensors such as cameras and/or microphones, that can sense information as needed for the present example implementations, as explained above.

Accordingly, the present example implementations may have various benefits and advantages. For example, but not by way of limitation, the example implementations are directed to learning from sensors directly, and may thus leverage the broad presence of visual sensors such as cameras and audio sensors such as microphones.

Further, the example implementations do not require text conversion from a pre-existing sensor in order for the machine to learn. The example implementations instead learn the sensor data relation without text. For example, the example implementations do not require conversion of image grayscale values to audio, audio to text for other conversion from one modality or another modality to a common medium.

Instead of converting across modalities, the present example implementations receive inputs of different modalities, such as image and audio, and processes the data with asymmetric dimensions and structures across the modalities. Pairing information between the modalities may be generated, such as during image—audio training, similar to learning with one's eyes and ears, and understanding corresponding image/audio pair, to correctly understand the connection. However, the present example implementations do so without requiring any manual human activity with respect to this process.

To accomplish the foregoing, the example implementations may use CNN—based auto encoders and a shared space across modalities. Accordingly, the example implementations can handle generation in both directions with respect to the modalities, such as to image and image to audio. Further, the present example implementations may generate audio spectrograms, which may result in a substantially smaller model size than the use of raw audios or the like.

By employing the neural network approach, the example implementations may learn to provide nonlinear interpolation in the signal space. As compared with related art lookup table approaches, the example implementations employ neural networks provide a compact form for generating signals, and provide essential efficiency with respect to memory space allocation. The example implementations aligned with neural science bottles such as "wired together, fire together" and the long-term depression process explained above. Further, the paired data may be fed into the example implementation architecture in a random way, instead of using a classroom model that pairs one example and one modality with multiple examples in another modality, such as one-to-one pairing coming in from a random order, in a manner akin to a human learning process, but perform in an automated manner.

While the foregoing example implementations are provided with respect to imaging technologies for medical diagnosis, the example implementations are not limited to, and other approaches may be employed as would be understood by those skilled in the art. For example, but not by way of limitation the example implementation may be employed in architectures for systems to support disabled persons, for autonomous robot training, machine learning algorithms and systems requiring a large volume of low-cost training data, and machine learning systems that are not to be limited by schedulers of a manual text labeler.

Additionally, the example implementations may be directed to a language independent device that can be trained to show a deaf person objects that other persons are physically. Because the present example implementations do not employ text per se, the training system can be language independent. Moreover, since devices associated with the architecture are communicatively coupled, or connected, to the network, people who live in the same region and speak the same language may train the system together.

Further, although the present example implementations are directed to visual and audio, other modalities maybe added to or substituted therefor without departing from the inventive concept. For example, but not by way of limitation, temperature or touch may be included in the machine, and the inclusion of the new modalities will not impact the prior learned modalities. Instead, the new modalities will learn by themselves, and gradually build more connections with the previous modalities.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

What is claimed is:

1. A computer-implemented method, comprising:
receiving first inputs associated with a first modality, and second inputs associated with a second modality;
processing the received first inputs and second inputs in a convolutional neural network (CNN), wherein a first set of weights are assigned to the first inputs and a second set of weights are assigned to the second inputs, wherein text labeling is not performed, the first inputs are not converted to the second mode, and the second inputs are not converted to the first mode;
determining a loss for each of the first inputs and the second inputs based on a loss function that applies the first set of weights, the second set of weights, and a presence of a co-occurrence, wherein the co-occurrence is associated with the first inputs and the second inputs in sequence within a common time window;
generating a shared feature space as an output of the CNN, wherein a distance between cells associated with the first inputs and the second inputs in the shared feature space is determined based on the loss associated with each of the first inputs and the second inputs; and based on the shared feature space, providing an output indicative of a classification or probability of a classification.

2. The computer-implemented method of claim 1, wherein a first anchor channel is associated with the first modality and a second anchor channel is associated with the second modality.

3. The computer-implemented method of claim 1, wherein the first modality comprises a visual mode and the second modality comprises an audio mode.

4. The computer-implemented method of claim 1, wherein the first inputs and the second inputs are received from one or more sensors.

5. The computer-implemented method of claim 4, wherein the one or more sensors comprise at least one of a camera associated with the first inputs and a microphone associated with the second inputs.

6. The computer-implemented method of claim 1, wherein the computer-implemented method is executed in a neural processing unit of a processor.

7. The computer-implemented method of claim 1, wherein the computer-implemented method is executed in a mobile communications device, a home management device, and/or a processor of a robotic device.

8. A non-transitory computer readable medium having a storage that stores instructions, the instructions executed by a processor, the instructions comprising:
  receiving first inputs associated with a first modality, and second inputs associated with a second modality;
  processing the received first inputs and second inputs in a convolutional neural network (CNN), wherein a first set of weights are assigned to the first inputs and a second set of weights are assigned to the second inputs, wherein text labeling is not performed, the first inputs are not converted to the second mode, and the second inputs are not converted to the first mode;
  determining a loss for each of the first inputs and the second inputs based on a loss function that applies the first set of weights, the second set of weights, and a presence of a co-occurrence, wherein the co-occurrence is associated with the first inputs and the second inputs in sequence within a common time window;
  generating a shared feature space as an output of the CNN, wherein a distance between cells associated with the first inputs and the second inputs in the shared feature space is determined based on the loss associated with each of the first inputs and the second inputs; and
  based on the shared feature space, providing an output indicative of a co-occurrence or not.

9. The computer-implemented method of claim 8, wherein the first modality comprises a visual mode and the second modality comprises an audio mode.

10. The computer-implemented method of claim 8, wherein the first inputs and the second inputs are received from one or more sensors, and wherein the one or more sensors comprise at least one of a camera associated with the first inputs and a microphone associated with the second inputs.

11. The computer-implemented method of claim 8, wherein the computer-implemented method is executed in a mobile communications device, a home management device, and/or a processor of a robotic device.

* * * * *